United States Patent
Mader

(10) Patent No.: US 9,375,806 B2
(45) Date of Patent: Jun. 28, 2016

(54) METHOD AND ARRANGEMENT FOR CREATING BEVELS ON THE EDGES OF FLAT GLASS

(71) Applicant: Leopold Mader, Neuhofen/Ybbs (AT)

(72) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 14/399,058

(22) PCT Filed: Jul. 17, 2013

(86) PCT No.: PCT/AT2013/000119
§ 371 (c)(1),
(2) Date: Nov. 5, 2014

(87) PCT Pub. No.: WO2014/012125
PCT Pub. Date: Jan. 23, 2014

(65) Prior Publication Data
US 2015/0075222 A1   Mar. 19, 2015

(30) Foreign Application Priority Data
Jul. 17, 2012   (AT) .............................. GM 296/2012

(51) Int. Cl.
*C03B 33/02*   (2006.01)
*C03B 33/023*   (2006.01)
(Continued)

(52) U.S. Cl.
CPC ............... *B23K 26/009* (2013.01); *B23K 26/40* (2013.01); *C03B 33/0222* (2013.01); *C03B 33/091* (2013.01); *C03B 33/093* (2013.01); *B23K 2203/50* (2015.10)

(58) Field of Classification Search
CPC ..................................................... C03B 33/102
See application file for complete search history.

(56) References Cited

U.S. PATENT DOCUMENTS 5,826,772 A * 10/1998 Ariglio .............. B23K 26/0736
225/2
8,188,404 B2 * 5/2012 Sakamoto .............. B28D 1/221
219/121.68

(Continued)

FOREIGN PATENT DOCUMENTS

EP    2 286 971 A1    2/2011
JP    H04-349132    12/1992

(Continued)

OTHER PUBLICATIONS

Machine Translation of WO 2008/080182 A1. Accessed Sep. 30, 2015. Foreign patent originally published Jul. 10, 2008.*

(Continued)

*Primary Examiner* — Angela Ortiz
*Assistant Examiner* — Cynthia Szewczyk
(74) *Attorney, Agent, or Firm* — Young & Thompson

(57) ABSTRACT

When dividing glass using laser radiation into blanks (5) made of glass, a bundled laser beam (1) is directed onto the glass to be divided, and while forming at least two blanks (5), the glass is divided with sides (15) lying in the area of the cut. After the glass is divided, a laser beam (1) is directed onto at least one edge (16) of a side (15) of the formed blank (5) in order to separate glass from the edge (16) while forming a bevel (17) that lies on the side (15). For forming the bevel (17), at least one laser source (6) and a reflector (19) assigned to the latter are moved along the side (15) so that the laser beam (1)—which with the plane of the blank (5) encompasses an acute angle—is effective for forming the bevel (17).

18 Claims, 6 Drawing Sheets

(51) Int. Cl.
*B23K 26/00* (2014.01)
*C03B 33/09* (2006.01)
*B23K 26/40* (2014.01)

(56) References Cited

U.S. PATENT DOCUMENTS

| | | | |
|---|---|---|---|
| 2004/0112882 A1 | 6/2004 | Miyairi et al. | |
| 2007/0039932 A1* | 2/2007 | Haase | B23K 26/4075 219/121.67 |
| 2007/0051469 A1 | 3/2007 | Bossi et al. | |
| 2007/0111480 A1* | 5/2007 | Maruyama | B23K 26/0057 438/463 |
| 2011/0049765 A1* | 3/2011 | Li | B23K 26/4075 264/400 |
| 2011/0107894 A1* | 5/2011 | Maekawa | B24B 9/10 83/869 |
| 2013/0126573 A1 | 5/2013 | Hosseini et al. | |
| 2014/0084040 A1* | 3/2014 | Zhang | C03B 33/02 225/3 |

FOREIGN PATENT DOCUMENTS

| | | |
|---|---|---|
| JP | H04-357133 | 12/1992 |
| JP | H09-225665 | 9/1997 |
| JP | 2000015467 A | 1/2000 |
| WO | 2008/080182 A1 | 7/2008 |
| WO | 2012-006736 | 1/2012 |

OTHER PUBLICATIONS

International Search Report, dated Nov. 28, 2013, from corresponding PCT application.
EP Office Action, dated Aug. 17, 2015; Application No. 13 750 624.2.
JP Office Action, dated Jan. 6, 2016; Application No. 2015-511857.

* cited by examiner

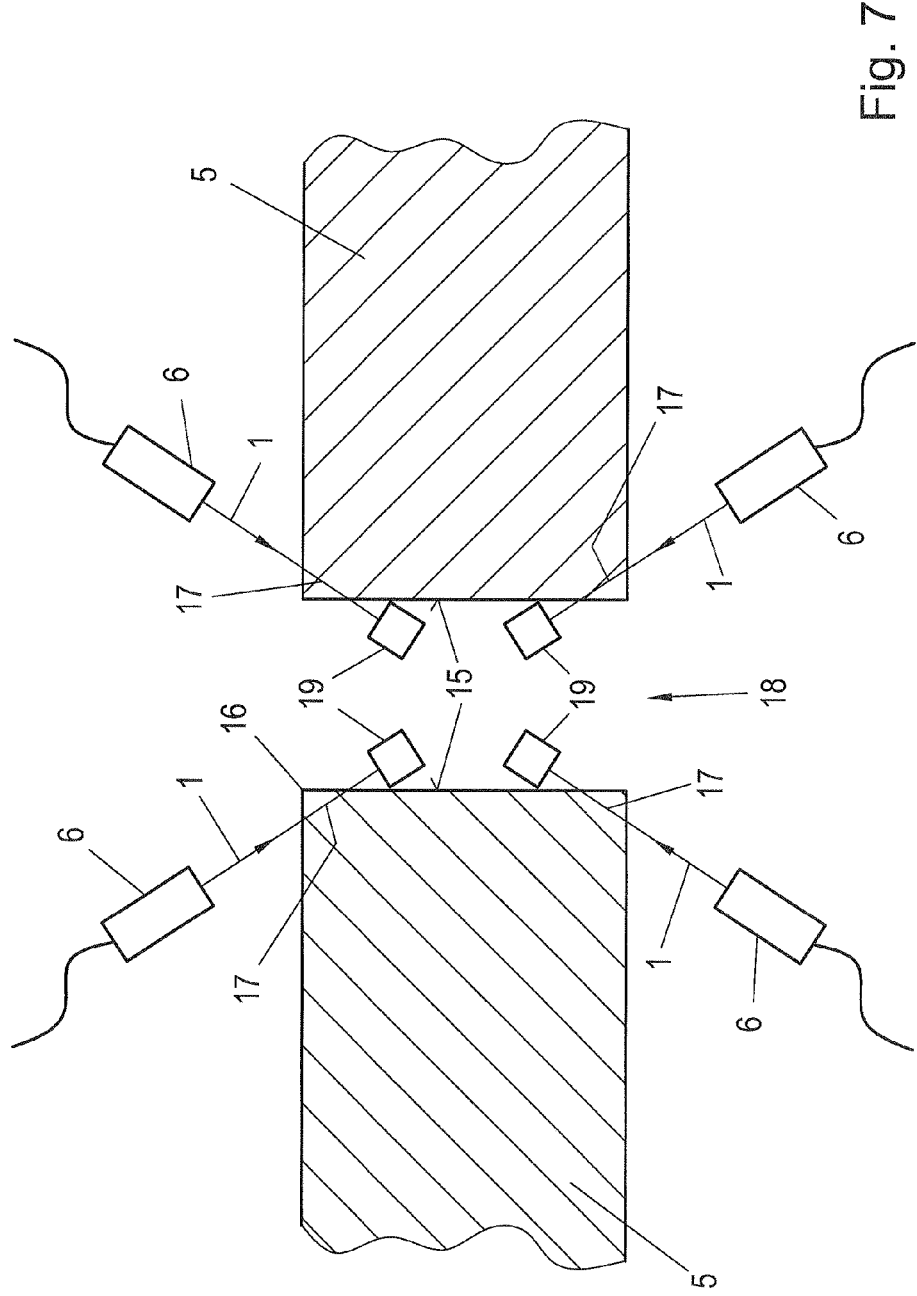

METHOD AND ARRANGEMENT FOR CREATING BEVELS ON THE EDGES OF FLAT GLASS

FIELD OF THE INVENTION

The invention relates to a method and a device with the features of the introductory parts of the independent claims that are directed toward the method, on the one hand, and toward the arrangement, on the other hand (EP 2 286 972 A).

BACKGROUND OF THE INVENTION

From AT 501 000 A1, a method and an arrangement for dividing glass, in particular flat glass, using laser radiation are known. With this known method, a bundled laser beam is directed onto the flat glass that is to be divided and reflected on a reflective surface arranged below the flat glass. The reflected laser beams are reflected again on the flat glass in the form of two bundles of laser beams, using a reflector that is arranged on the head of the laser and that has an opening for the bundled laser beams, in which reflector two cavity-like, elongated reflecting surfaces are provided. By the bundled laser beam, a microcrack is produced in the flat glass without heating the flat glass. The laser beam bundle reflected by the reflective surfaces on the reflector creates areas heated on both sides of the microcrack. Under the action of the thermal stresses resulting therefrom, the microcrack is opened up over the entire thickness of the flat glass, and the flat glass is divided.

Another method for dividing flat glass with use of laser beams is known from EA 004167 B1. In this known method, a laser beam is used, in particular a $CO_2$ laser, whereby first a focused laser beam is used, and then an unfocused laser beam is used. Using the focused laser beam, a temperature that exceeds the softening temperature is produced in the separating line that is provided. The unfocused laser beam acting on the glass at a temperature above the softening temperature produces additional tensile stresses, so that the separating line that is provided is opened up.

A method for separating glass materials by means of a laser has become known from a publication of the Laser Center, Hannover, EV (http//www.lzh.de). This known method is based on the multiple reflections of an Nd:YAG laser that for the most part is transmissive for glass materials (MULTIPLE LASER BEAM ABSORPTION, MLBA). This method uses an Nd:YAG laser whose radiation is transmitted at up to 85% depending on the glass thickness. The total absorption is increased by multiple reflections of the beam by the glass that is to be divided, and a thermal stress is induced over the entire glass thickness. In this case, an arrangement is used that has a laser head, an upper reflector applied on the laser head, and a lower reflector provided below the glass, i.e., on the side of the glass opposite the laser head.

With this method, several glass panels that lie above one another are also to be divided in one working step, just like composite safety glass (VSG).

Up until now, the practical implementation of the known method has been unsuccessful because of its poor performance and an unreliable process of glass fracture.

From EP 2 286 972 A, it is known to produce bevels on the edges of sides of flat glass panels by a laser beam acting on the glass panel after the latter has been scored in advance using a cutting wheel.

Another method and a device for producing a cutting slit in a glass panel using laser radiation is known from WO 2008/080182 A1. In this method for dividing a glass panel with laser radiation, the glass panel is heated locally by the laser radiation with one or more penetrations of a first surface of the glass panel to a second surface of the glass panel that is opposite and at some distance from the latter and is opened up in the glass panel by the thus produced heat stresses of the cutting slit. The laser radiation is introduced into the glass panel essentially without reflection and refraction on the first surface.

In particular in WO 2008/080182 A, the procedure is to be performed so that the laser radiation is run through an optical component, namely a prism, up to a beam exit face of the same and then is introduced essentially without refraction and without reflection into a liquid that is in direct contact with the beam exit face and from this first surface of the glass panel, in direct contact with the liquid, into the glass panel. In this case, the liquid is to have at least approximately the same refraction index as the glass panel. In this case, it is provided that the laser radiation is introduced at an oblique angle of incidence relative to the axis of incidence in an input point of the bundle of rays by the first surface of the glass surface, whereby the angle of incidence of the laser radiation from the first surface is selected so that a total reflection of the laser radiation is carried out by the second surface of the glass panel.

In the dividing of glass, "laser scoring" and "laser blasting" are known from A. Ostendorf et al. "Licht statt Schneidradchen—Trennen von Glaswerkstoffen mittels Laserstrahlung [Light Instead of Cutting Wheels—Separating Glass Materials by Means of Laser Radiation]," in the Future of Glass—from the Tradition of High-Tech Products, $5^{th}$ Symposium; June 17-18, Zwiesel 2004, pp. 31-40. This bibliographic reference also mentions the post-treatment of laser-separated glass materials, in which a glass span is to be blasted on the edge by means of a $CO_2$ laser in order to produce a crack-free bevel. However, the method known from the above-mentioned bibliographic reference without details is to be usable only in the case of laser-separated glass components, since otherwise separated glass parts would be immediately destroyed during heating by means of laser radiation.

SUMMARY OF THE INVENTION

The object of the invention is to indicate a method and an arrangement of the above-mentioned type, with which during the dividing of glass panels (cutting of glass panels) using laser beams, at least one bevel is also produced on the thus-formed sides of the glass panel, so that the subsequent grinding, i.e., the subsequent machining with a grinding tool, is omitted.

This object, which relates to the method, is achieved with the features of the independent claim aimed at the method, and, insofar as the arrangement is concerned, with the features of the independent claim aimed at the arrangement.

Preferred and advantageous further developments of the method according to the invention and the arrangement according to the invention are subjects of the subclaims.

With the method according to the invention and the arrangement according to the invention, it is avoided that chipping occurs in laser-cut glass panels because of the extraordinarily sharp edges on the side when the glass panels are set up. This is also true when they are flat on the margin, notwithstanding the fact that then tensile stresses develop in the edge area. Such chipping is disadvantageous, since it is a starting point for microcracks in the glass panel, which later can result in fracturing the glass panel.

It is of significant importance for the invention that for the production of the at least one bevel, a second, additional laser head is provided, which becomes active after the first laser head that produces the cut—with which glass panels are divided—and produces the bevel or the bevels.

In the method according to the invention, it is advantageous that the glass panels need not be specially scored when producing bevels.

With the measures according to the invention or the arrangement according to the invention, the sharp edges are eliminated by in particular at least one bevel being produced with the at least one additional laser head.

In the invention, the bevel is produced advantageously under the action of a laser beam.

When implementing the method according to the invention, measures are preferably taken to prevent or at least to minimize reflections of the laser beam in the case of its entrance into the glass of the glass material.

In this respect, a medium is provided in an embodiment in the case of the method according to the invention, and said medium is arranged in the area of the laser beam to cover the surface of the glass material (flat glass) and has a refraction index, which is at least similar, if not (essentially identical) to that of the glass in the glass material. This medium that acts, so to speak, as "optical putty" can be a fluid, in particular a liquid, which surrounds the edge on which a bevel is to be produced. For example, water or glycerin is suitable as a medium within the scope of the invention.

An alternative possibility for preventing or for minimizing the above-mentioned reflections consists in aiming the laser beam at the glass of the glass material at the Brewster angle. This measure can also be applied together with the use of the medium that acts as "optical putty."

When the medium, e.g., the liquid, flows and in this case flushes the edge of the glass material (flat glass), at the same time a cooling is produced, which gives rise to the stress in the glass that is advantageous for blasting the glass part when producing the bevel.

When executing the method according to the invention, it is preferred when the laser source is within the medium at least in the area of the exit of the laser beam from the laser source. Also, reflectors for the laser beam are preferably arranged at least in the area of the arrival of the laser beam into the reflector and the reemergence of the reflected laser beam from the reflector within the medium.

The reflectors used within the scope of the invention are, for example, (simple) mirrors, such as metal mirrors. Within the scope of the invention, reflectors that are considered can also be complex components that optionally integrate a cooling and other secondary functions within the necessary optical functions. In any case, the reflectors are to have an entrance interface and an exit interface, whereby at least the entrance interface and the exit interface are arranged within the medium that acts as "optical putty," and not necessarily the entire reflector.

Within the scope of the invention, using polarized laser radiation is taken into consideration. In this case, it has turned out to be advantageous to aim the laser beam at the glass material at the so-called "Brewster angle," because, in that case—assuming a polarization parallel to the plane of the surface of the glass material or the medium that is arranged on the latter—any reflection is eliminated and the laser beam completely enters through the surface into the glass material, and the use of a medium becomes obsolete or the reflections that do occur when the refraction index of the medium and that of the glass material do not completely coincide can be suppressed.

When the laser beam is aimed at the glass material at the above-mentioned Brewster angle, the medium, which covers the surface of the glass material and acts as "optical putty" because of its refraction index (the latter is the same as or at least similar to that of the glass material), is not absolutely necessary, since in the case where the laser beam is incident at the Brewster angle, no reflection occurs.

Within the scope of the invention, it is also considered to use (two) laser beams with different properties to produce the bevel. For example, to form the crack, a laser beam with a wavelength on the order of 0.5 µm can be used. To open up the crack, i.e., to separate the glass part while forming the desired bevel, a laser beam with a wavelength on the order of 10.6 µm (e.g., $CO_2$ laser) can be used.

In the invention, consideration is also given to bundling the laser beam during reflection, whereby the focal point is preferably within the glass material. The bundling can be achieved using concave reflectors. This embodiment of the method according to the invention makes it possible in addition to produce bevels with convex surfaces.

In the method according to the invention, a bevel on one edge of the side can be produced on the side of the flat glass as glass material or bevels can be produced, in particular simultaneously, on both edges of the side of flat glass.

Although not necessary, the method according to the invention and the arrangement according to the invention are also suitable in particular for the production of bevels on glass materials (flat glass) that are produced by laser parts.

In this preferred application of the method according to the invention, it is provided that for the production of the at least one bevel, a second additional laser head is provided that becomes active after the first laser head that produces the cut and produces the bevel or bevels.

With the method according to the invention and the arrangement according to the invention, it is avoided that chipping occurs in laser-cut glass panels because of the extraordinarily sharp edges on the side when the glass panels are set up. This is also true when they are flat on the margin, notwithstanding the fact that then tensile stresses develop in the edge area. Such chipping is disadvantageous, since it is a starting point for microcracks in the glass panel, which later can result in fracturing the glass panel.

With the measures according to the invention or the arrangement according to the invention, the sharp edges are eliminated by at least one bevel being produced with the at least one additional laser head on the sides of in particular laser-cut glass parts.

BRIEF DESCRIPTION OF THE DRAWINGS

The method that is applied in the invention and an arrangement with which the method according to the invention can be implemented are explained in more detail below with reference to the drawings. Here.

DETAILED DESCRIPTION OF THE INVENTION

Figure 1:
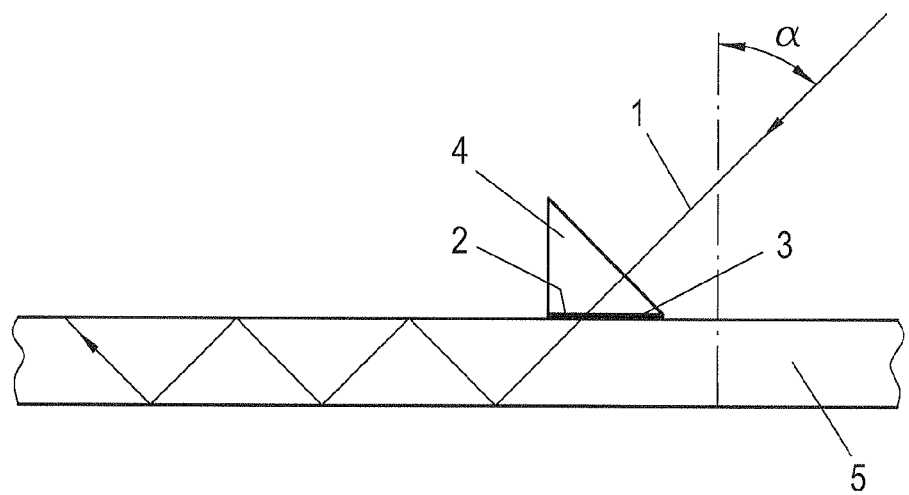
FIG. 1 shows the principle of cutting glass with a laser.

In the glass cutting shown in FIG. 1, using laser radiation with application of the effect of the total reflection of the laser beam on the second glass surface, a laser beam 1 strikes a prism 4, whereby the angle is close to 90°. The angle α between the normal surface of the glass 5 to be divided and the optical axis of the laser beam 1 is greater than or equal to the angle of the inside total reflection in the glass 5. In order to introduce the laser beam 1 from the prism 4 into the glass 5 to be divided, it is important that they be in optical contact. This is achieved in FIG. 1 in that in the area 2 between the prism 4 and the glass 5 to be divided, an optical contact is created, which is created by, for example, special liquids (water or glycerin) or (flexible) transparent (film-like) materials 3.

Figure 4:
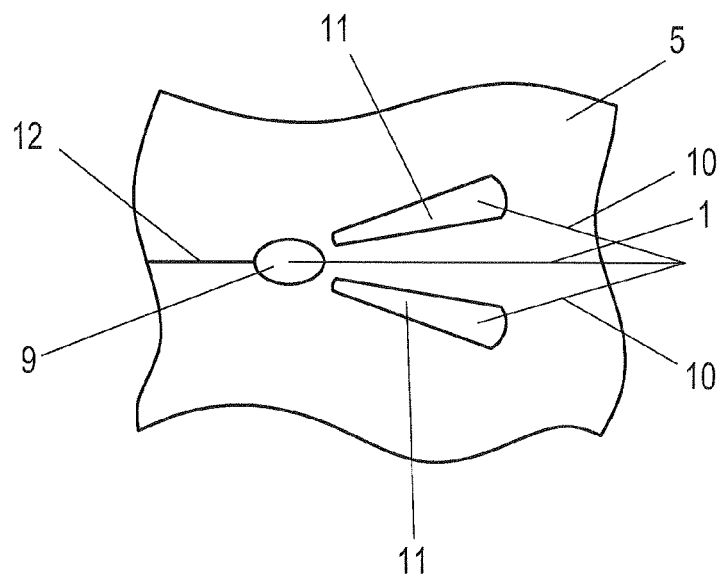
FIG. 4 diagrammatically shows hot areas that develop when cutting glass with laser radiation.

Within the scope of the invention, it can be provided that the sides of the prism 4 have complex geometric shapes, so that they produce hot spots with specific shapes (cf. FIG. 4).

The optical contact between prism 4 and glass 5 can also be achieved by precise alignment of the contact surfaces between glass 5 and prism 4, whereby the maximum permissible gap in the area 2 should be smaller than the wavelength of the radiation.

The advantages of the method diagrammatically shown in FIG. 1 are that cutting tables with reflecting surfaces are no longer required and that a high yield with low losses occurs because of the total reflection.

Figure 2:
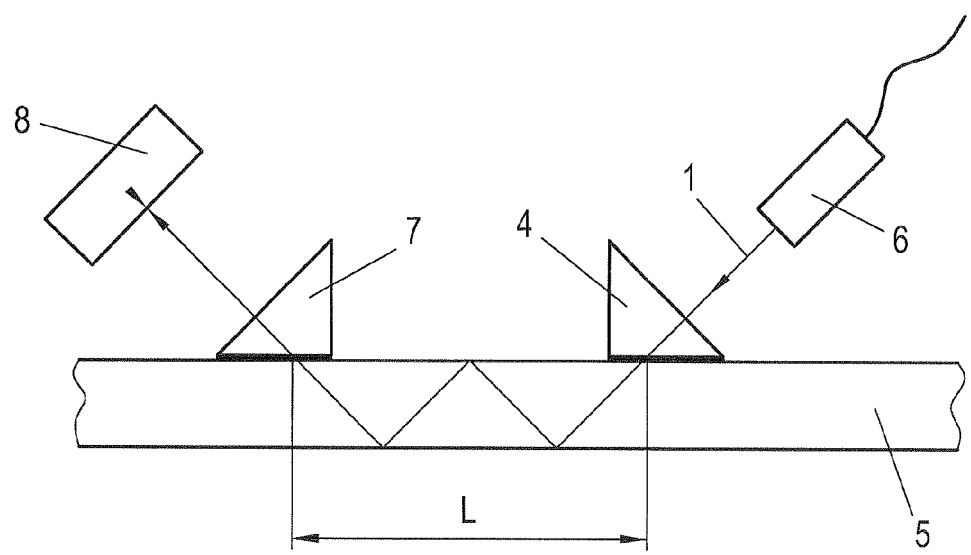
FIG. 2 shows a variant of the principle of FIG. 1.

In FIG. 2, it is shown that the laser beam 1 from a beam source 6 enters into the prism 4 and enters from the latter into the glass 5 to be divided. The beam 1 continues into the glass 5 with repeated total reflection over the distance L and exits through a second prism 7 from the glass 5 and is reflected on a mirror 8 (reflecting focusing system), so that the reflected laser beam forms a beam with the desired and required shape.

Figure 3A:
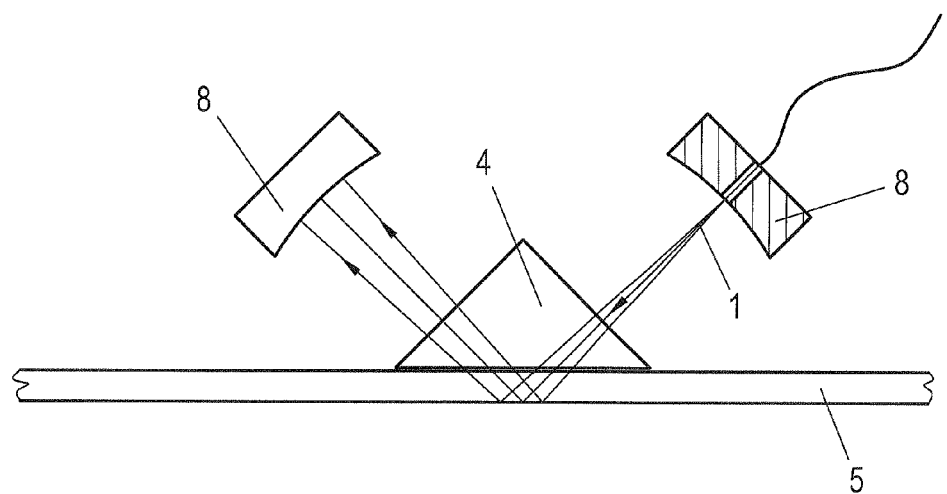
FIGS. 3a and b show embodiments of the plot of the laser radiation.
Figure 3B:
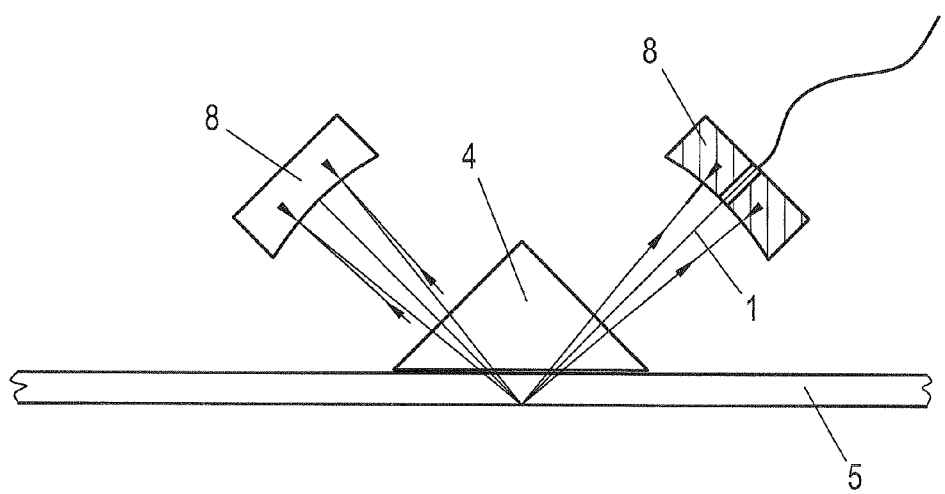

The practical application of this diagram is shown for thin glass in FIGS. 3a and 3b.

FIG. 4 shows diagrammatically and in top view that it is advantageous to form on the glass 5 hot spots according to the pattern shown in FIG. 4. Main laser beam 1 forms the hot spot 9 in FIG. 4; conversely, reflected laser beams 10 in FIG. 4 form hot spots 11, so that the glass 5 divides along a separating line 12.

Figure 5:
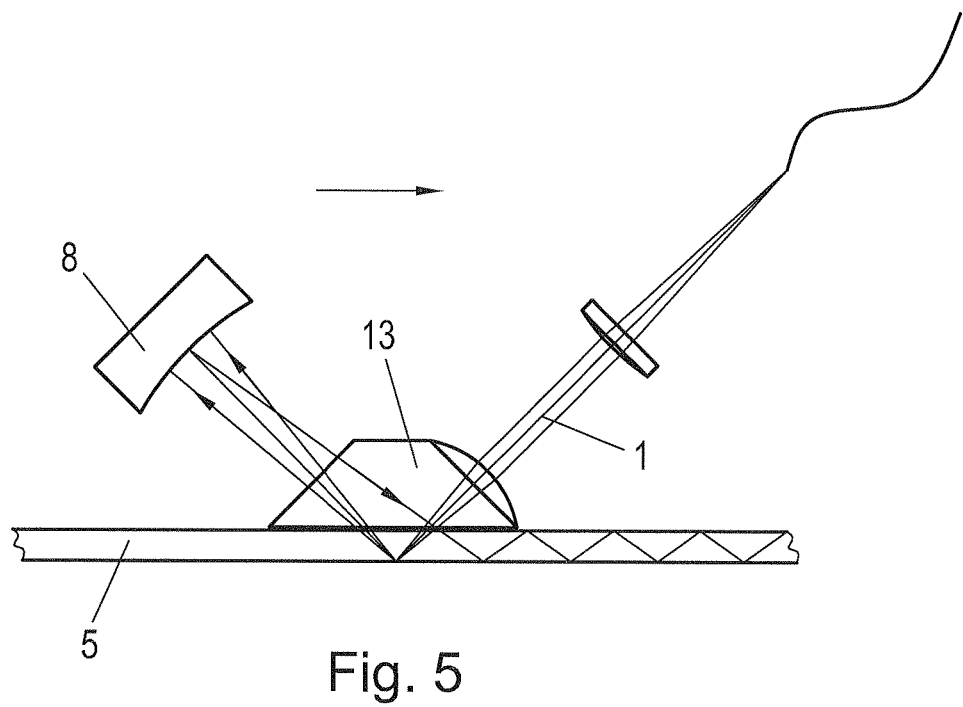
FIG. 5 shows another embodiment of the cutting of glass with laser radiation.

In a special case, the functions of the reflecting components 8, as shown in FIG. 5, can be achieved by a specially shaped surface 4 of the prism 13 shown in FIG. 5, which prism is designed with the suitable shape and is provided with a reflective coating.

Figure 6:
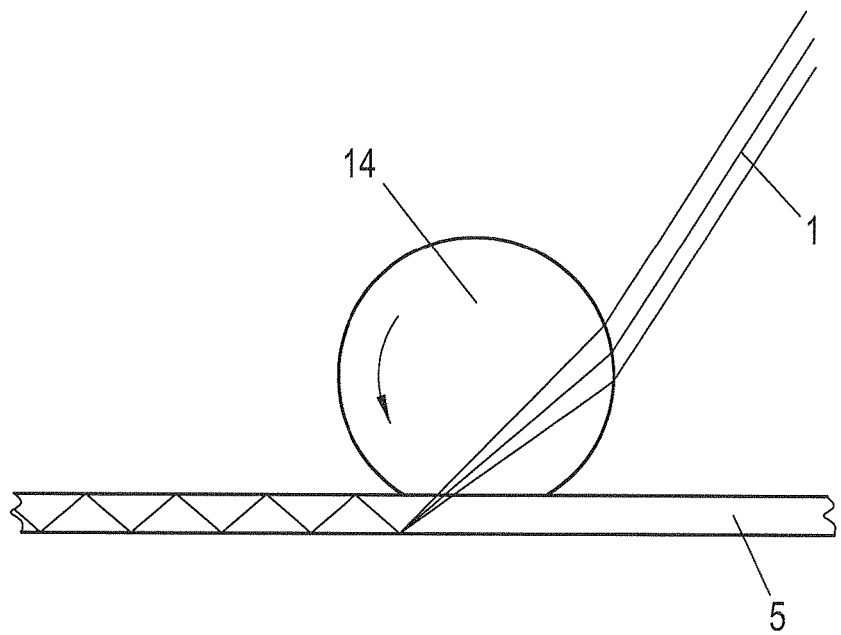
FIG. 6 shows another embodiment of the cutting of glass with laser radiation, FIG. 7 diagrammatically shows the production according to the invention of two bevels, FIG. 8 diagrammatically shows the production according to the invention of only one bevel.

It is also possible to aim the laser beam 1 into the glass 5 in order to achieve the effect of the inner total reflection by flexible transparent materials being used, which enhance the optical contact in the area 2, where they are in contact with the glass 5, which is to be cut. In a special case (cf. FIG. 6), this can be achieved by a ball 14 made of transparent material (flexible) being pressed on the glass 5 (for example, a ball 14 made of transparent polymer) and the laser beam 1 being directed through it.

As shown in FIG. 7, additional laser sources 6 are used in the method according to the invention for the production of bevels 17 on the sides 15 of the divided glass 5, in which a gap 18 is formed in the area of the previously produced cut.

Figure 8:
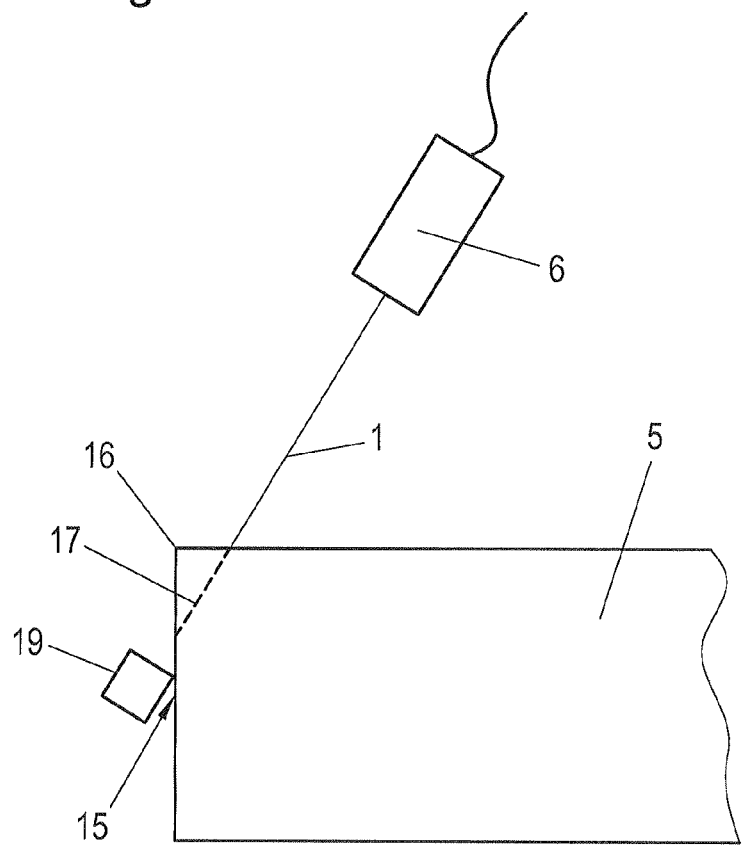

Although not shown in FIG. 7 and in FIG. 8, the presence of a medium on the glass surface is also taken into consideration in these embodiments. This medium, e.g., water or glycerin, has a refraction index, which is at least similar, if not identical, to that of the glass of a flat glass panel. This medium can, if it—as preferred—is a liquid, flush the side of the glass panel on which the edges are processed by the forming of bevels.

In particular, it is provided according to FIG. 7 that for each of the bevels 17 to be produced on the sides 15, a laser source 6 is provided. A reflector 19 is assigned to each laser source 6. The laser sources 6 and the assigned reflectors 19 are moved by a drive (not shown) along the sides 15 in the area of the gap 18 and produce bevels 17, according to the previously-explained principle, on the sides 15 of the glass parts (glass blanks) that are produced by the parts of glass 5.

It is understood that the two sides 15 of the divided glass 5 do not need to be processed at the same time while producing bevels 17. This can also take place in succession.

By the same token, it is not necessary, although advantageous, to produce two bevels 17 on one side 15 of glass 5. Often, only one bevel 17 is sufficient (cf. FIG. 8) or else the bevels 17 are produced in succession, which means a lower equipment cost.

In FIG. 8, it is shown in heavily schematized form how a bevel 17 is produced on the side 15 of a glass blank formed by parts of glass 5 in the area of one edge 16 of the side 15 of the blank using a laser beam 1. In this case, the beam path can run in principle under the influence of the reflector 19 as is shown in FIGS. 1 to 7.

Figure 9:
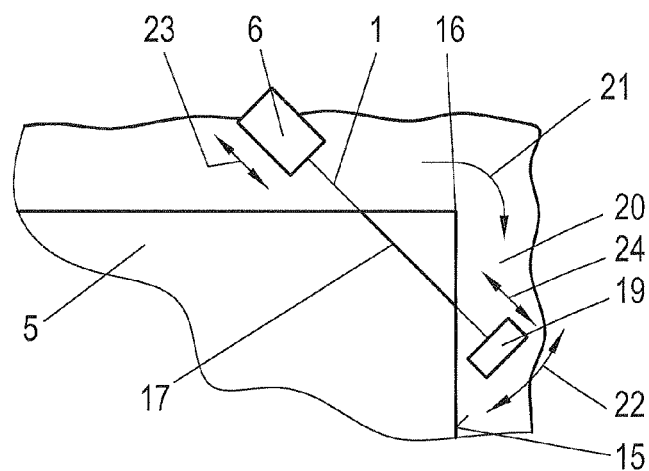
FIG. 9 shows one embodiment of an arrangement for implementing the method according to the invention.
Figure 10:
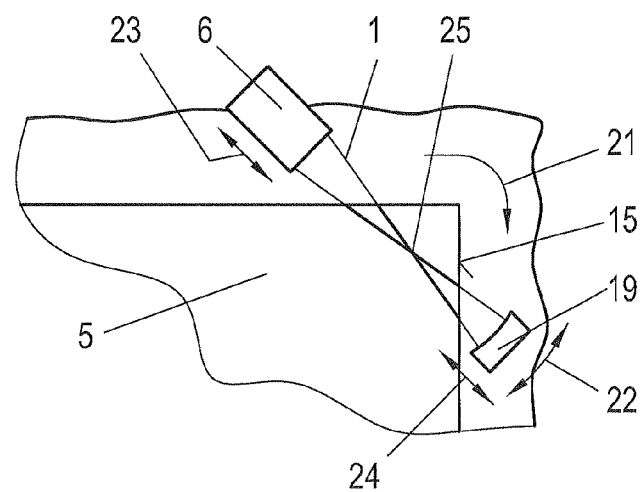
FIG. 10 shows a modified embodiment.
Figure 11:
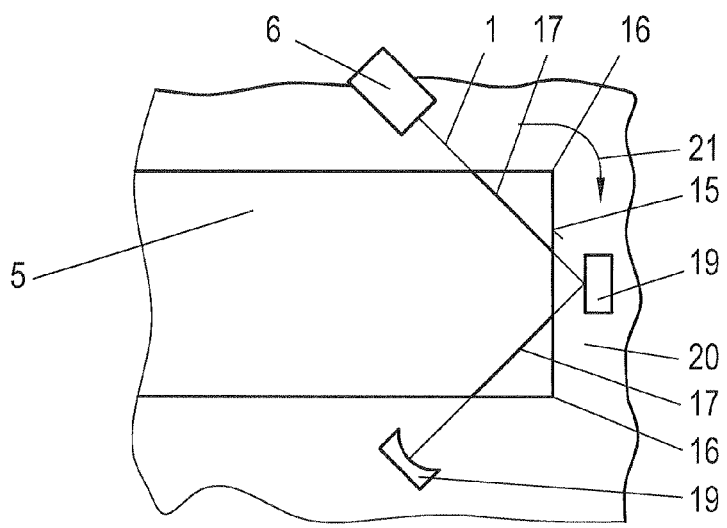
FIG. 11 shows an embodiment in which two edges of one side are provided with bevels.

When the method according to the invention is executed, the procedure can be performed, for example, as is shown in FIG. 9, 10, or 11.

In the embodiment of FIG. 9, the glass 5, in particular in the area of the edge 16, on which a bevel 17 is to be produced, is covered with a medium 20 that has a refraction index, which is identical to that of glass (1.4-1.6) or at least comes close. As a result, reflections of the beam 1 exiting from the laser source 6 are prevented or at least minimized during transfer into the glass 5 and during exiting from the same. This medium 20, which acts almost as "optical putty," can be, for example, a liquid, in particular water or glycerin.

The medium 20, which is present in the area of the edge 16 and covers the latter, can also flow (arrow 21), i.e., flush the edge 16, which has the advantage that at the same time, the area lying outside of the laser beam 1, i.e., the area of the glass edge 16, which is to be blasted during the formation of the bevel 17, is cooled, so that stresses that produce the fracture, i.e., support the production of the bevel 17, develop.

In the variant, shown in FIG. 9, of the method according to the invention for producing a bevel 17, the laser source 6 is also arranged at least in the area of the exit point of the laser beam 1 from the laser source 6 into the medium 20. The same applies for the reflector 19, which is also arranged at least in its area that is effective for the reflection in the medium 20. The reflector 19 can be pivotable (arrow 22).

In the arrangement shown in FIG. 9, the laser source 6 and also the reflector 19 can be adjusted, whereby the adjustment, in particular in the direction of the laser beam 1, is possible.

FIG. 10 shows a variant, in which a reflector 19 with a concave reflective surface is designed, so that the laser beam 1 is bundled, which produces an improvement of the effectiveness. In addition, the variant of FIG. 10 makes it possible to produce bevels 17 with an outside surface that is not flat but rather convex (round or polygonal). By adjusting the laser source 6 (arrow 23) and/or the reflector 19 (arrow 24), the focus 25 of the laser beam 1 can be set so that the production of the bevel 17 is optimized.

With the method according to the invention, as is shown in FIG. 11, it can be achieved that both bevels 17 are produced on the side 15 of the glass panel 5 in a single operation. It is advantageous when the second reflector 19 is also arranged at least with its area, effective for the reflection, within the medium 20, which makes possible a transition of the laser beam 1 into the glass 5 and from the glass 5 in a manner that is as free of reflection as possible.

Within the scope of the invention, it is taken into consideration that during the production of the bevel, the procedure is performed with laser beams, which have different wavelengths. In this case, the (first) wavelength can be selected for the one laser beam so that it is especially advantageous and effective for cracking, and a (second) wavelength can be selected for the second laser beam so that it is especially advantageous and effective for opening up the crack. For example, a laser beam that is responsible for the cracking has a (first) wavelength (in the green area) of 0.5 µm; conversely, for the second laser beam (e.g., $CO_2$ laser for opening up the crack), a (second) wavelength is preferably one with a wavelength of 10.6 µm.

In summary, an embodiment of the invention can be described as follows.

After the glass is divided, in particular using laser radiation, into blanks 5 made of glass, a laser beam 1 is directed onto at least one edge 16 of a side 15 of the blank 5 that is formed in order to separate glass from the edge 16 while forming a bevel 17 lying on the side 15. For forming the bevel 17, at least one laser source 6 and a reflector 19 assigned to the latter are moved along the side 15 so that the laser beam 1—which with the plane of the blank 5 encompasses an acute angle—is effective for forming the bevel 17. The side 15 is flushed by a liquid 20 whose refraction index is at least close to that of the glass.

The invention claimed is:

1. A method for producing a bevel (17) on an edge (16) of a side of a product (5) made of glass material, wherein the bevel is produced by a laser beam (1), the method comprising:
   in an area of entrance of the laser beam (1) into the glass material, providing a medium (20) that has a refraction index that is at least close to that of the glass material of the product (5) so that the laser beam is not refracted when it enters the glass material, wherein the medium (20) covers the area of the edge (16) on which the bevel (17) is to be produced;
   providing the medium (20) in an area of exit of the laser beam (1) from the glass material; and
   arranging a reflector (19) that reflects the laser beam (1) with a reflecting area of the reflector within the medium (20).

2. Method according to claim 1, wherein the medium (20) is a liquid.

3. Method according to claim 2, wherein the liquid is water or glycerin.

4. Method according to claim 2, wherein the liquid is applied in a bubble-free manner.

5. Method according to claim 1, wherein a position of the laser source is adjustable relative to the side of the glass material on which the bevel is to be produced.

6. Method according to claim 1, wherein a position of the reflector is adjustable relative to the side of the glass material on which the bevel is to be produced.

7. Method according to claim 1, wherein the reflector redirects the laser beam after exiting from the edge toward a second edge and wherein the laser beam that exits from the second edge is reflected from a second reflector to the reflector.

8. Method according to claim 1, wherein the reflector has one of a flat reflective surface and a concave reflective surface.

9. Method according to claim 1, further comprising forming a crack at a location of the bevel with a first said laser beam with a first wavelength and opening up the crack to obtain the bevel with a second said laser beam with a second wavelength different from the first wavelength.

10. Method according to claim 9, wherein the first wavelength is in a green area, and the second wavelength is 10.6 µm.

11. Method according to claim 1, wherein the medium flushes the edge on which the bevel is to be produced.

12. Method according to claim 1, wherein the reflector is concave and wherein the laser source and the reflector are positioned so that a focus of the laser beam lies in the glass material.

13. Method according to claim 1, for dividing glass using laser radiation into blanks made of glass, in which a bundled laser beam is directed onto the glass to be divided, and the glass, with the formation of at least two blanks, is divided with sides lying in the area of the cut, wherein after the glass is divided, a laser beam is directed onto at least one edge of a side of the blank that is formed in order to separate glass from the side while forming a bevel that lies on the side while applying the method.

14. Method according to claim 13, wherein the at least one bevel is produced by the action of at least one laser beam that is independent from the laser beam by which the glass is divided into blanks.

15. Method according to claim 14, wherein on one side of the blank, bevels are produced in the area of two edges of the side.

16. Method according to claim 13, wherein on one side of the blank, bevels are produced in the area of two edges of the side.

17. Arrangement for implementing the method according to claim 13 with a laser source (6) for dividing the glass (5) into at least two blanks, wherein at least one additional laser arrangement (6) is provided, whose active plane is at an acute angle to the active plane of the first laser arrangement (6) and whose laser beam (1) is directed onto an area within one edge (16) on the side (15) of the blank (5) and wherein reflectors (19) are assigned to the laser sources (6) for producing bevels (17), which reflectors can be adjusted by a drive synchronously with the laser sources (6) along the side (15) of the blank (5).

18. Arrangement according to claim 17, wherein for the dividing of glass (5), a laser source (6) and a prism that consists of optically transparent materials in contact with the first surface of the glass that is to be divided, and a reflection system are provided in order to reflect and again to introduce into the glass the laser beam that exits after repeated inside total reflection from the glass at an exit point through another prism.

* * * * *